(12) United States Patent
Smith et al.

(10) Patent No.: US 9,851,845 B2
(45) Date of Patent: Dec. 26, 2017

(54) TEMPERATURE COMPENSATION FOR TRANSPARENT FORCE SENSORS

(71) Applicant: Apple Inc., Cupertino, CA (US)

(72) Inventors: John S. Smith, Cupertino, CA (US); Manu Agarwal, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/793,987

(22) Filed: Jul. 8, 2015

(65) Prior Publication Data

US 2016/0048266 A1    Feb. 18, 2016

Related U.S. Application Data

(60) Provisional application No. 62/036,603, filed on Aug. 12, 2014, provisional application No. 62/091,322, filed on Dec. 12, 2014.

(51) Int. Cl.
| | |
|---|---|
| *G06F 3/041* | (2006.01) |
| *G06F 3/044* | (2006.01) |
| *G06F 3/045* | (2006.01) |
| *G01L 1/18* | (2006.01) |
| *G01L 1/20* | (2006.01) |
| *G01L 1/16* | (2006.01) |
| *G01L 1/00* | (2006.01) |

(Continued)

(52) U.S. Cl.
CPC .............. *G06F 3/0418* (2013.01); *G01L 1/18* (2013.01); *G01L 1/2281* (2013.01); *G01L 1/2293* (2013.01); *G01L 25/00* (2013.01); *G06F 3/0414* (2013.01)

(58) Field of Classification Search
CPC ...... G06F 3/0414; G06F 3/0416; G06F 3/045; G06F 3/044; G06F 2203/04103; G06F 2203/04105; G01L 1/005; G01L 1/16; G01L 1/18; G01L 1/20; G01L 1/205
See application file for complete search history.

(56) References Cited

U.S. PATENT DOCUMENTS

| | | | |
|---|---|---|---|
| 7,511,702 | B2 | 3/2009 | Hotelling |
| 8,305,358 | B2 | 11/2012 | Klighhult et al. |
| 8,479,584 | B2 | 7/2013 | Ohsato |

(Continued)

FOREIGN PATENT DOCUMENTS

| | | |
|---|---|---|
| CN | 1796955 | 7/2006 |
| CN | 101071354 | 11/2007 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Ryan A Lubit
(74) *Attorney, Agent, or Firm* — Brownstein Hyatt Farber Schreck, LLP

(57) ABSTRACT

An optically transparent force sensor element compares a force reading from a first strain-sensitive film element with a second strain-sensitive film element, having a compliant and thermally conductive intermediate layer positioned therebetween to compensate for temperature changes. While in the idle state, the optically transparent force sensor can be periodically calibrated to account for additional changes in temperature.

13 Claims, 9 Drawing Sheets

(51) Int. Cl.
*G01L 1/22* (2006.01)
*G01L 25/00* (2006.01)

(56) References Cited

U.S. PATENT DOCUMENTS

| | | | |
|---|---|---|---|
| 8,780,074 B2 | 7/2014 | Castillo et al. | |
| 8,780,543 B2 | 7/2014 | Molne et al. | |
| 9,024,910 B2 | 5/2015 | Stephanou et al. | |
| 9,030,427 B2 | 5/2015 | Yasumatsu | |
| 9,063,599 B2 | 6/2015 | Yanagi et al. | |
| 9,110,532 B2 | 8/2015 | Ando et al. | |
| 9,116,569 B2 | 8/2015 | Stacy et al. | |
| 9,256,101 B2 | 2/2016 | Watanabe et al. | |
| 2012/0293491 A1 | 11/2012 | Wang et al. | |
| 2013/0082970 A1* | 4/2013 | Frey | G06F 3/0414 345/173 |
| 2016/0048266 A1 | 2/2016 | Smith et al. | |
| 2016/0103545 A1 | 4/2016 | Filiz et al. | |
| 2016/0147352 A1 | 5/2016 | Filiz et al. | |
| 2016/0299576 A1* | 10/2016 | Zhu | G06F 3/0346 |

FOREIGN PATENT DOCUMENTS

| | | |
|---|---|---|
| CN | 101201277 A | 6/2008 |
| CN | 101950224 | 1/2011 |
| CN | 102012772 | 4/2011 |
| CN | 102175362 A | 9/2011 |
| CN | 103026327 | 4/2013 |
| CN | 204461655 U | 7/2015 |
| EP | 0467562 | 1/1992 |
| EP | 2629075 | 8/2013 |
| JP | 201039458 A | 2/2010 |
| JP | 2010197066 | 9/2010 |
| WO | WO 02/35461 | 5/2002 |
| WO | WO 2011/156447 | 12/2011 |
| WO | WO 2013/177322 | 11/2013 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touch-screens-354860, Mar. 7, 2014, 1 page.

Rausch, "Printed piezoresistive strain sensors for monitoring of light-weight structures," SENSOR+TEST Conferences 2011—SENSOR Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, 1 page.

* cited by examiner

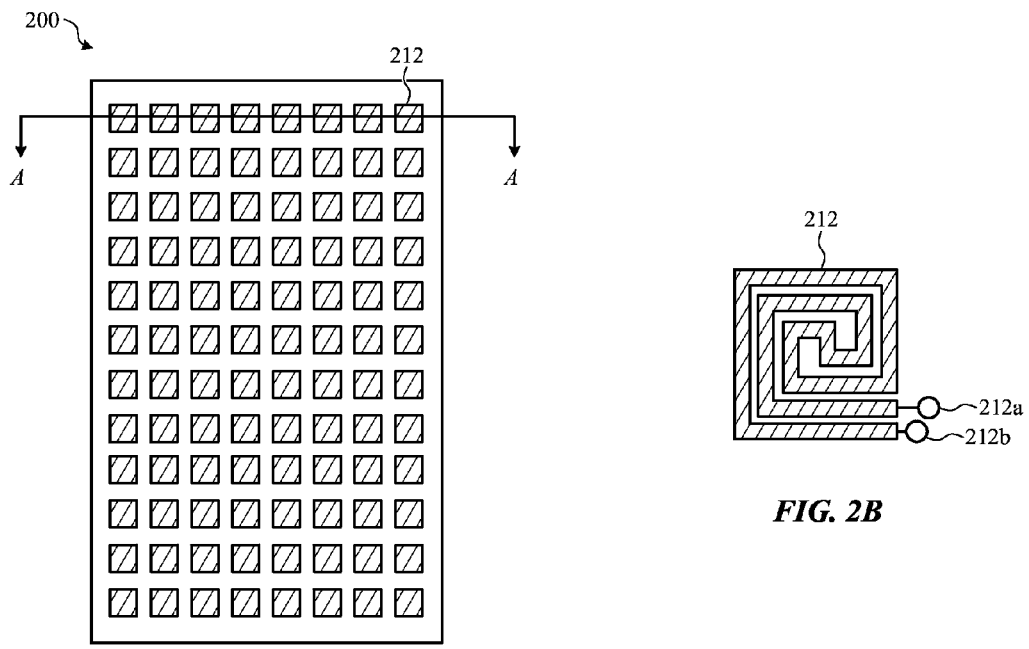
FIG. 2A
FIG. 2B
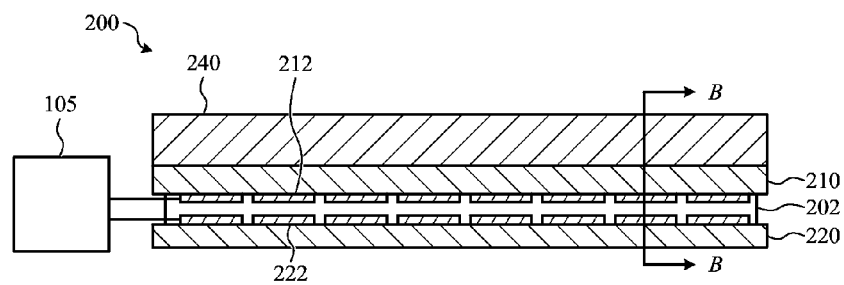
FIG. 2C

TEMPERATURE COMPENSATION FOR TRANSPARENT FORCE SENSORS

CROSS-REFERENCE TO RELATED APPLICATIONS

This application claims the benefit under 35 U.S.C. §119 (e) of U.S. Provisional Patent Application No. 62/036,603, filed on Aug. 12, 2014, and entitled "Temperature Compensation for Transparent Force Sensors," and U.S. Provisional Patent Application No. 62/091,322, filed on Dec. 12, 2014, and entitled "Temperature Compensation for Transparent Force Sensors," both of which are incorporated by reference as if fully disclosed herein.

TECHNICAL FIELD

Embodiments described herein generally relate to force sensing inputs on a surface and, more particularly, to force sensing inputs on a surface using a transparent strain-sensitive element associated with a display element of an electronic device.

BACKGROUND

Many electronic devices may include a touch-sensitive surface for receiving user input. Example devices which may benefit from a touch sensitive surface may include cellular telephones, smart phones, personal digital assistants, tablet computers, laptop computers, track pads, wearable devices, health devices, sports accessory devices, peripheral input devices, and so on.

The touch-sensitive surface may detect and relay the location of one or more user touches (e.g., have multi-touch sensing functionality) which may be interpreted by the electronic device as a command or a gesture. In one example, the touch input may be used to interact with a graphical user interface. Despite many advantages, touch sensitive surfaces are generally limited to providing only the location and/or area of the one or more touch events.

However, many materials used with force sensitive surfaces expand and/or contract with changes in temperature. For example, a user's finger can locally increase the temperature of the area that user is touching. In other cases, ambient temperature and/or internal heat-producing components can cause a temperature gradient through the electronic device.

Undesirably, such temperature changes can cause the strain-sensitive surfaces to either expand or contract, which in turn may place the surface under stress and/or strain. In these cases, temperature changes can be registered by the strain-sensitive surface as a force input. In other examples, forces registered from temperature effects can obscure or conceal actual force input from a user, or register as false positives for force inputs.

Accordingly, there may be a present need for an improved force-input surface capable to detect and relay the force applied at one or more user touch locations, while effectively compensating for effects of temperature.

SUMMARY

Embodiments described herein may relate to, include, or take the form of an optically transparent force sensor for use as input to an electronic device.

In certain embodiments, the optically transparent force sensor may include at least a force-receiving surface, a first and second substrate each comprising an optically transparent material, and each substrate including respectively a first and second strain-sensitive film. In some examples, the first substrate may be disposed below the force-receiving surface such that the first strain-sensitive film may experience a compression upon an application of force to the force-receiving surface.

The substrates may be coupled to one another by an adhesive layer made from a thermally conductive and mechanically compliant material. As a result of the thermal conductivity of the adhesive layer, the temperature of the first and second strain-sensitive film may be substantially equalized. However, due to the compliance of the material selected for the adhesive layer, the force experienced by the first and second strain-sensitive films may be substantially different. In some examples, the adhesive layer may have a shear modulus less than the shear modulus of the first substrate (for example, one tenth as much). In this manner, the force experienced by the first strain-sensitive film at a certain temperature may be greater than the force experienced by the second strain-sensitive film at the same temperature.

In many examples, the first and second strain-sensitive films, the first and second substrates, and the adhesive therebetween may be made from an optically transparent material. For example, the substrates may be made from glass and the strain-sensitive films may be made from indium-tin oxide, nanowire, carbon nanotubes, graphene, piezoresistive semiconductors, or piezoresistive metals.

In many embodiments, the strain-sensitive films may be constructed of the same material. However, alternate embodiments may use different materials for the strain-sensitive films; such materials may have equivalent temperature coefficients of resistance. Similarly, the materials may be selected to have an equivalent or substantially identical coefficient of thermal expansion.

Some embodiments described herein may relate to, include, or take the form of a method of determining the resistance of a sensor formed from a strain-sensitive material, the method including at least the operations determining the temperature of the resistive element, calculating a predicted expansion based on a coefficient of thermal expansion of the strain-sensitive material, determining a predicted thermal drift based on the predicted expansion, measuring the resistance of the sensor, and augmenting the measured resistance based on the predicted thermal drift.

Some embodiments described herein may relate to, include, or take the form of a method of determining the strain on sensor formed from a strain-sensitive material, the method including at least the operations of determining the temperature and resistance of the resistive element under the application of known force, determining a predicted thermal drift based on the temperature and resistance, storing the calibration, measuring the resistance and temperature of the sensor, and augmenting the measured resistance based on the predicted thermal drift.

Further embodiments described herein may relate to, include, or take the form of a method of calibrating a force sensor with a first and second strain-sensitive films each having a known no-force resistance at a known temperature, the first and second strain-sensitive films separated by a thermally conductive layer, the method including at least the operations of determining that the force sensor may be in an idle state, determining the resistance of the first strain-sensitive film when in the idle state, determining the resistance of the second strain-sensitive film when in the idle state, determining the temperature of the first strain-sensitive film when in the idle state, determining the temperature of the second strain-sensitive film when in the idle state, updating the known no-force resistance at the known temperature of the first strain-sensitive film at least in part based on the determined resistance and determined temperature of the first strain-sensitive film, and lastly, updating the known no-force resistance at the known temperature of the second strain-sensitive film at least in part based on the determined resistance and determined temperature of the second strain-sensitive film.

Further embodiments described herein may relate to, include, or take the form of a method of calibrating a force sensor with a first and second strain-sensitive films, the first and second strain-sensitive films separated by a thermally conductive layer, the method including at least the operations of determining that the force sensor may be in an idle state, determining the resistance of the first strain-sensitive film when in the idle state, determining the resistance of the second strain-sensitive film when in the idle state, updating the known no-force conditions at least in part based on the measured resistances of the first and second strain-sensitive films.

Still further embodiments described herein may relate to, include, or take the form of a method of determining thermal drift of a resistive sensor with a first and second resistive element arranged as a voltage divider with a source node, a reference node, and a measurement node, the method including at least the operations of determining that the resistive sensor may be in an idle state, electrically coupling the source node and reference node such that the first and second resistive element are electrically connected in parallel (or effectively in parallel for an AC measurement), injecting a known current into the measurement node, measuring a voltage between the measurement node and the coupled source node and reference node, determining an idle state resistance of the resistive sensor from the voltage, and comparing the idle state resistance of the resistive sensor to a known parallel resistance of the first and second resistive elements to determine thermal drift.

In one embodiment, a method of correcting for thermal drift of a resistive sensor with a first and second resistive element arranged as a voltage divider with a source node, a reference node, and a measurement node, includes at least the operations of determining that the resistive sensor may be in an idle state, measuring a voltage between the measurement node and a reference node, injecting a known current into the measurement node, measuring a voltage between the measurement node a reference node, storing the measured voltages, measuring the corresponding voltages under an unknown load condition, and calculating an estimated force from the measured voltages.

In one embodiment, a method of correcting for thermal drift of a resistive sensor with a first and second resistive element arranged as a voltage divider with a source node, a reference node, and a measurement node, includes at least the operations of determining that the resistive sensor may be in an idle state, measuring a voltage between the measurement node and a reference node, determining an impedance at the reference node, measuring a voltage between the measurement node a reference node, storing the measured values, measuring the corresponding voltage and impedance under an unknown load condition, and calculating an estimated force from the measured values.

Still further embodiments described herein may relate to, include, or take the form of a method of determining thermal drift of a resistive sensor with a first and second resistive element arranged as a voltage divider with a source node, a reference node, and a measurement node, the method including at least the operations of determining that the resistive sensor may be in an idle state, measuring a voltage between the measurement node and the source node and a reference node, injecting a known current into the measurement node, measuring a voltage between the measurement node and the source node and reference node, determining an idle state resistance of the resistive sensor from the measured voltages, and comparing the idle state resistances of the resistive sensor to determine thermal drift coefficients.

In another embodiment, a method of correcting for thermal drift of a resistive sensor with a first and second resistive element arranged as a voltage divider with a source node, a reference node, and a measurement node, includes at least the operations of determining that the resistive sensor may be in an idle state, measuring a voltage between the measurement node and a reference node, injecting a known current into the measurement node, measuring a voltage between the measurement node a reference node, storing the measured voltages, measuring the corresponding voltages under an unknown load condition, and calculating an estimated force from the measured voltages.

In another embodiment, a method of correcting for thermal drift of a resistive sensor with a first and second resistive element arranged as a voltage divider with a source node, a reference node, and a measurement node, includes at least the operations of determining that the resistive sensor may be in an idle state, measuring a voltage between the measurement node and a reference node, determining an impedance at a sensor node, measuring a voltage between the measurement node a reference node, storing the measured values, measuring the corresponding voltage and impedance under an unknown load condition, and calculating an estimated force from the measured values.

In another embodiment, a method of correcting for thermal drift of a resistive sensor with a first and second resistive element arranged as a voltage divider with a sensor node, a reference node, and a measurement node, includes at least the operations of determining that the resistive sensor may be in an idle state, biasing the sensor with a time varying voltage at a first selected frequency (or other time-varying function), injecting a time varying current into the sensor node with a second selected frequency (or other time-varying function), measuring a first voltage between the measurement node and a reference node, determining a first impedance at the sensor node, and storing the first voltage and first impedance. Thereafter, when an unknown force is applied to the resistive sensor, a second voltage measurement between the measurement node and the reference node may be taken, and a second impedance at the sensor node can be determined. Thereafter, the second voltage and second impedance can be compared against the stored values to determine a magnitude of the unknown force. In some embodiments, the reference node can be formed as a resistor ladder.

Some embodiments described herein may relate to, include, or take the form of an electronic device including an input surface including at least a substrate, a first sensor coupled to the substrate and formed from a material with a strain-sensitive electrical property, a second sensor coupled to the substrate and separated from the first sensor by a selected distance, the second sensor formed from a material with a strain-sensitive electrical property, and a controller configured to obtain a differential measurement of the electrical property of the first sensor and the electrical property of the second sensor. Some embodiments may include the controller further configured to obtain a single-ended measurement of the electrical property of the first sensor and a single-ended measurement of the electrical property of the second sensor.

Some embodiments described herein may relate to, include, or take the form of an electronic device including at least an input surface including a substrate with a top surface. The input surface can itself include a strain sensor including a first and second strain-sensitive resistors arranged as a voltage divider. In many cases, the first strain-sensitive resistor can be separated from the top surface by a first distance and the second strain-sensitive resistor separated from the top surface by a second distance. The strain sensor can also include a common node coupled to both the first and second strain-sensitive resistor. The electronic device can also include a controller configured to perform the operations of injecting a selected current into the common node and measuring a voltage between the common electrical node and a reference node.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

FIG. 2A depicts a top view of an example strain-sensitive structure including a grid of optically transparent strain-sensitive films.

FIG. 2B depicts a top detailed view of an optically transparent serpentine strain-sensitive film which may be used in the example strain-sensitive structure depicted in FIG. 2A.

FIG. 2C depicts a side view of a portion of the example strain-sensitive structure of FIG. 2A taken along line A-A.

The use of the same or similar reference numerals in different figures indicates similar, related, or identical items.

Figure 1:
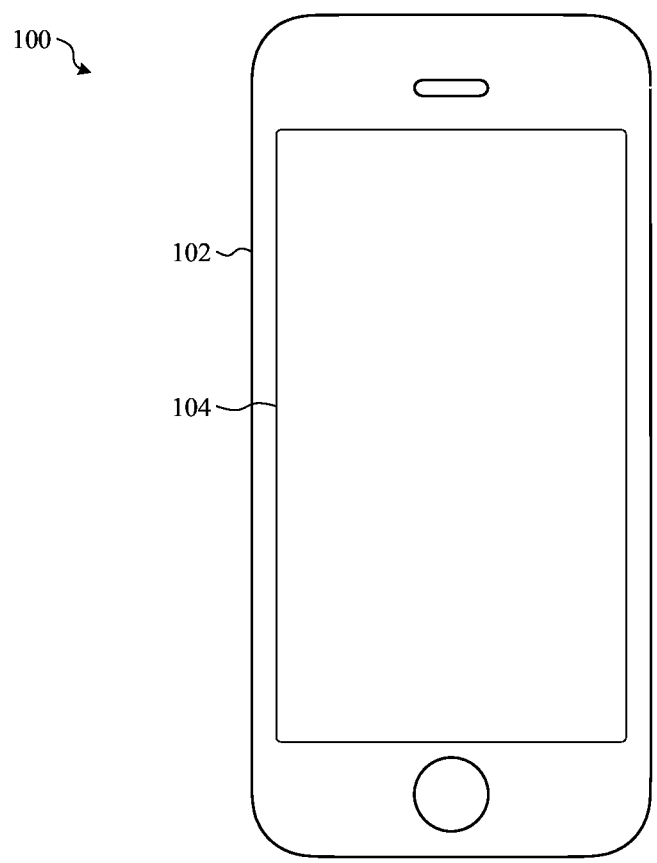
FIG. 1 depicts an example electronic device incorporating at least one transparent force sensor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein may relate to or take the form of temperature-compensating optically transparent force sensors for receiving user input to an electronic device.

Certain embodiments described herein also relate to strain-sensitive structures including one or more strain-sensitive films for detecting a magnitude of a force applied to a device. In one example, a transparent strain-sensitive film is integrated with, or adjacent to, a display element of an electronic device. The electronic device may be, for example, a mobile phone, a tablet computing device, a computer display, a computing input device (such as a touch pad, keyboard, or mouse), a wearable device, a health monitor device, a sports accessory device, and so on.

Generally and broadly, a user touch event may be sensed on a display, enclosure, or other surface associated with an electronic device using a force sensor adapted to determine the magnitude of force of the touch event. The determined magnitude of force may be used as an input signal, input data, or other input information to the electronic device. In one example, a high force input event may be interpreted differently from a low force input event. For example, a smart phone may unlock a display screen with a high force input event and may pause audio output for a low force input event. The device's responses or outputs may thus differ in response to the two inputs, even though they occur at the same point and may use the same input device. In further examples, a change in force may be interpreted as an additional type of input event. For example, a user may hold a wearable device force sensor proximate to an artery in order to evaluate blood pressure or heart rate. One may appreciate that a force sensor may be used for collecting a variety of user inputs.

In many examples, a force sensor may be incorporated into a touch-sensitive electronic device and located above a display of the device, or incorporated into a display stack. Accordingly, in such embodiments, the forces sensor may be constructed of optically transparent materials. For example, an optically transparent force sensor may include at least a force-receiving surface, a first and second substrate each comprising an optically transparent material, and each substrate including respectively a first and second strain-sensitive film. In many examples, the first substrate may be disposed below the force-receiving surface such that the first strain-sensitive film may experience a compressive force upon application of force to the force-receiving surface.

A transparent strain-sensitive film is typically a compliant material that exhibits at least one electrical property that is variable in response to deformation, deflection, or shearing of the film. The transparent strain-sensitive film may be formed from a piezoelectric, piezoresistive, resistive, or other strain-sensitive materials.

Transparent strain-sensitive films can be formed by coating a substrate with a transparent conductive material or otherwise depositing such a material on the substrate. Suitable transparent conductive materials include, for example, gallium-doped zinc oxide, polyethyleneioxythiophene (PEDOT), indium tin oxide (ITO), carbon nanotubes, graphene, silver nanowire, nickel nanowires, other metallic nanowires, and the like. Potential substrate materials include, for example, glass, sapphire or transparent polymers like polyethylene terephthalate (PET) or cyclo-olefin polymer (COP). Typically, when a piezoresistive or resistive film is strained, the resistance of the film changes as a function of the strain. The resistance can be measured with an electrical circuit.

In certain embodiments, the resistive element may be measured by using a Wheatstone bridge. In such an example, a voltage Vg may be measured across the output of two parallel voltage dividers connected to a voltage supply Vs. One of the voltage dividers may include two resistors of known resistance R1 and R2, the other voltage divider including one resistor or known resistance R3 and the resistive element Rx. By comparing the voltage across the output of each voltage to the voltage of the voltage supply Vs, the unknown resistance $R_x$ of the resistive element may be calculated. Furthermore, if the relationship between electrical resistance and mechanical strain of the material selected for the resistive element is known, the strain $\epsilon$ as a function of the change in resistance may be calculated.

In this way, a transparent piezoresistive or resistive film can be used as a strain gauge. If transparency is not required, then other film materials may be used, including, for example, nickel, Constantan and Karma alloys for the conductive film and a polyimide may be used as a substrate. Other semiconductor materials may be used for other non-transparent embodiments such as, but not limited to, silicon, polysilicon, gallium alloys, and so on. Nontransparent applications include force sensing on track pads or behind display elements. In general, transparent and non-transparent strain-sensitive films may be referred to herein as "strain-sensitive films" or simply "films." In some embodiments, the resistive element may be measured by using a single voltage divider.

In some embodiments, the strain-sensitive film can be patterned into an array of lines, objects, or other geometric elements herein referred to as "film elements." The regions of the strain-sensitive film or the film elements may also be connected to sense circuitry using electrically conductive traces or electrodes. In general, the strain-sensitive film exhibits a measurable change in an electrical property in response to a force being applied to the film. In one example, as a force is applied to the device, one or more of the film elements is deflected or deformed.

Sense circuitry, in electrical communication with the one or more film elements or film electrodes, may be adapted to detect and measure the change in the electrical property (e.g., resistance) of the film due to the force applied. Based on the difference between the measured electrical property of the film and a known baseline for the same electrical property, an estimated amount of force applied may be computed.

In some cases, the strain-sensitive film may be patterned into film elements, each film element including an array of traces generally oriented along one direction. This configuration may be referred to as a piezoresistive or resistive strain gauge configuration. In general, in this configuration the strain-sensitive-film may be composed of a material whose resistance changes in a known fashion in response to strain. For example, some materials may exhibit a change in resistance linearly in response to strain. Other materials may exhibit a change in resistance logarithmically in response to strain. Still further materials may exhibit a change in resistance in a different manner. For example, the change in resistance may be due to a change in the geometry resulting from the applied strain such as an increase in length combined with decrease in cross-sectional area may occur in accordance with Poisson's effect. The change in resistance may also be due to a change in the inherent resistivity of the material due to the applied strain. For example, the applied strain may make it easier or harder for electrons to transition through the material.

In these and related embodiments, a piezoresistive or resistive strain gauge configuration, each element may be formed from a pattern of the strain-sensitive-film, aligned to respond to strain along a particular axis or at a particular location. For example, for many materials, if strain along an x-axis is to be measured, the element should have majority of its trace length aligned with the x-axis.

In still further embodiments, the strain-sensitive film may be formed from a solid sheet of material and may be placed in electrical communication with a pattern of electrodes disposed on one or more surfaces of the strain-sensitive film. The electrodes may be used, for example, to electrically connect a region of the solid sheet of material to sense circuitry. This configuration may be referred to as a piezo-strain configuration. In this configuration, the strain-sensitive film may generate a charge when strained. The strain-sensitive film may also generate different amounts of charge depending on the degree of the strain. In some cases, the overall total charge is a superposition of the charge generated due to strain along various axes.

One or more strain-sensitive films may be integrated with or attached to a display element of a device, which may include other types of sensors. In one typical embodiment, a display element may also include a touch sensor included to detect the location of one or more user touch events. In certain embodiments, the strain-sensitive film may be integrated with, or placed adjacent to, portions of a display element, herein generally referred to as a "display stack" or simply a "stack." A strain-sensitive film may be integrated with a display stack, by, for example, being attached to a substrate or sheet that is attached to the display stack. Alternatively, the strain-sensitive film may be placed within the display stack in certain embodiments. Although certain examples are herein provided with respect to strain-sensitive film integrated with a display stack, in some embodiments, the strain-sensitive film may be integrated in a portion of the device other than the display stack. Using a touch sensor in combination with the transparent strain-sensitive film in accordance with some embodiments described herein, the location and magnitude of a touch on a display element of a device can be estimated.

One challenge with using a strain-sensitive film within a display stack is that the given electrical property (for example, resistance) may change in response to temperature variations as the electronic device is transported from place to place, or used by a user. For example, each time a user touches the touch screen, the user may locally increase the temperature of the screen and strain-sensitive film. In other examples, different environments (e.g., indoors or outdoors) may subject the electronic device to different ambient temperatures. In still further examples, an increase in temperature may occur as a result of heat produced by electronic elements of the device.

In still further examples, the strain-sensitive film may also expand and contract in response to changes in other environmental conditions, such as changes in humidity or barometric pressure. In the following examples, the electrical property is a resistance and the variable environmental condition is temperature. However, the techniques and methods described herein may also be applied to different electrical properties, such as capacitance or inductance, which may be affected by changes in other environmental conditions.

In these examples, a change in temperature or other environmental conditions, either locally or globally, may result in expansion or contraction of the strain-sensitive film, electronic device housing, and/or other components adjacent to the film which in turn may change the electrical property (e.g., resistance) measured by the sense circuitry. In many cases, the changes in the electrical property due to temperature change may obfuscate any changes in the electrical property as a result of an input force.

For example, a deflection may produce a reduction or increase in the resistance or impedance of the strain-sensitive film. A thermal gradient may also produce a reduction or increase in the resistance or impedance of the strain-sensitive film depending on whether the gradient is positive or negative. As a result, the two effects may cancel each other out or amplify each other resulting in an insensitive or hypersensitive force sensor. A similar reduction or increase in the resistance or impedance of the strain-sensitive film could also be produced by, for example, an increase in temperature of the strain-sensitive film due to heat produced by other elements of the device. Generally, compression or tension of the force-sensing elements defined on the substrate of the force-sensing film creates strain on the force-sensing elements. This strain may cause a change in resistance, impedance, current or voltage that may be measured by associated sense circuitry; the change may be correlated to an amount of force that caused the strain. Accordingly, in some embodiments the force-sensing elements on the film may be considered or otherwise operate as strain gages.

One solution to the problem to cancel the effect of environment is to provide more than one strain sensor in the same environmental conditions using one sensor as a reference point to compare the reading of the other sensor. In such a case, each of the two strain sensors may be constructed of substantially identical materials such that the reference sensor reacts to the environment in the same manner as the measurement sensor.

In some embodiments, a first sensor may be positioned or disposed below a surface which receives an input force. Positioned below the first sensor may be an intermediate layer of thermally conductive material, such as a thermally conductive adhesive of low durometer. In other examples the intermediate layer may be rigid. Positioned below the intermediate layer may be a second sensor which may function as a reference sensor. In many cases, the reference sensor can be positioned a greater distance from the surface than the first sensor. The entire stack may be environmentally sealed within a housing.

In some embodiments, a first sensor may be positioned or disposed below a surface which receives an input force. Positioned below the first sensor may be a rigid layer of thermally conductive material, such as glass. A second sensor may be positioned below the rigid layer. The second sensor is typically exposed to a different amount of strain, as a function of force, as a result of the rigid layer. In this manner, the first and second sensors may be exposed to substantially similar thermal environments while being exposed to differing strains. In this configuration, environmental effects such as ambient temperature may be substantially cancelled.

In an alternate embodiment, the difference of the measured value between the two sensors may be a function of the force applied to the input surface. In this manner, the combination of the two force sensors may be less sensitive to temperature than either of the sensors alone. As with some embodiments described herein, the entire stack may be environmentally sealed within a housing.

In this manner, the thermal conductivity of the intermediate layer may normalize the temperature between the first and second sensor and at the same time the compliance of the intermediate layer may distribute or otherwise absorb a substantial portion of the deflection of the first sensor such that second sensor may not be deformed at all. In other examples, the second sensor may only be partially or otherwise negligibly deformed.

However, in certain examples, the intermediate layer may not necessarily normalize the temperature between the first and second sensor uniformly. For example, the materials selected for the intermediate layer and the first and second sensors might not necessarily have completely uniform coefficients of thermal expansion. In these examples, the thermal conductivity of the intermediate layer may not necessarily eliminate all effects of temperature that can negative the performance of the transparent force sensor. In other examples, the first and second sensors may not have identical thermal coefficients of resistance and/or expansion. In these and other examples, a thermal gradient can develop from the first sensor to the second sensor, causing differences in the response of each sensor to force. In these cases, an accurate force measurement may be difficult to obtain.

Accordingly, certain embodiments described herein relate to methods for calibrating the transparent force sensor so as to reduce, mitigate, or eliminate the effects of temperature.

In one embodiment, a first temperature sensor may be thermally coupled to the first sensor and a second temperature sensor may be thermally coupled to the second sensor. In these examples, the temperature sensors may be any number of suitable temperature-sensitive elements including, but not necessarily limited to, thermistors, infrared temperature sensors, MEMS temperature sensors, and the like. In these examples, the measured temperature of the first sensor can be used to calibrate the strain output of the first sensor. Similarly, the measured temperature of the second sensor can be used to calibrate the strain output of the second sensor.

For certain form factors, inclusion of one or more temperature sensors in addition to the one or more force sensors can be impractical. In these embodiments, compensation for thermal effects may be performed by periodic calibration of the sensors. For example, in many embodiments, the force sensor may be aligned with a touch sensor. In this manner, the force sensor can collaborate with the touch sensor to determine when (and where) the force sensor is receiving force. Alternatively and importantly, the force sensor can also collaborate with the touch sensor to determine when the force sensor is not receiving force. In another embodiment, the touch sensor can indicate to the force sensor when no touch input (and thus, no force input) is being received. In many examples, this may be referred to as an 'idle' state of the force sensor. During the idle state, the force sensor may begin one or more calibration methods.

In one embodiment, an idle-state calibration method can include directly measuring the resistance of the first and second sensor. By comparing the measured idle resistance of the first and second sensors to the expected no-force resistance of the first and second sensors the effects of temperature can be determined. For example, if the measured idle resistance of the first sensor is higher than the expected no-load resistance of the first sensor, then future outputs received from the first sensor may be adjusted down.

Measuring the idle resistance of the force sensors can be accomplished in a number of ways. For example, in the case that two force sensors are arranged as a voltage divider, measurement of the idle resistance can be accomplished by injecting a known current into the voltage output node of the voltage divider. Thereafter, voltage across each sensor can be measured. In other examples, a differential voltage can be obtained. In still further examples, the voltage between a common node of the voltage divider and a reference voltage (e.g., ground) can be obtained. In still further examples, both a differential voltage and a single-ended voltage measurement (e.g., comparison to reference voltage) can be obtained.

In another embodiment, measurement of the idle resistance of the force sensors can be accomplished by coupling an offset digital to analog converter (hereinafter, "DAC") to the output node of the voltage divider prior to any signal amplification. In some embodiments, the output of the voltage divider may be differentially compared to a selectable reference voltage. In still further examples, the output of the voltage divider can be digitally converted and passed to a microcontroller that may use data corresponding to previous measurements to determine noise and error correction. In other words, a history of the temperature and/or calibration of the force sensor can be recorded and used to affect future calibration decisions.

In another embodiment, measurement of the idle resistance of the force sensors can be accomplished by coupling an offset DAC to the output node of the voltage divider, and biasing the voltage divider with a time varying signal. For example, the output of the voltage divider may be differentially compared to a selectable reference voltage, for example a resistor ladder. In some examples, a time varying current may be injected at the output node of the voltage divider. The resistor ladder may be biased with a corresponding time varying signal. In still further examples, the output of the DAC can be digitally processed to extract the differential and parallel properties of the sensor resistors and passed to a microcontroller that may use data corresponding to previous measurements to determine noise and error correction. In this manner, a history of the temperature and/or calibration of a force sensor can be recorded and used to affect future calibration operations. In other embodiments, a reference node may comprise a resistor ladder with selectable taps.

In still further embodiments, when the sensor(s) is determined to be idle, the sensor output can be measured and/or calibrated for both temperature dependence and strain dependence. If a statistical relationship between the temperature dependence and strain dependence of the sensor is found, the statistical relationship can be used to correct future force measurements. In some embodiments, the statistical relationship may be linear. In some embodiments, the statistical relationship may be non-linear.

FIG. 1 depicts an example electronic device 100 incorporating at least one transparent force sensor. The electronic device 100 may include a display 104 disposed within a housing 102. The display 104 may be any suitable display element that may include a stack of multiple layers including, for example, a liquid crystal display (LCD) layer, a cover glass layer, a touch input layer, and so on. Positioned within the layer stack may be at least one transparent force sensor. In many examples, each of the layers of the display 104 may be adhered together with an optically transparent adhesive. In some embodiments, each of the layers of the display 104 may be attached or deposited onto separate substrates that may be laminated or bonded to each other. The display stack may also include other layers for improving the structural or optical performance of the display, including, for example, a cover glass sheet, polarizer sheets, color masks, and the like. Additionally, the display stack may include a touch sensor for determining the location of one or more touches on the display 104 of the electronic device 100.

FIG. 2A depicts a top view of an example strain-sensitive structure 200 including a grid of optically transparent strain-sensitive films. The strain-sensitive structure 200 includes a substrate 210 having disposed upon it a plurality of independent strain-sensitive films 212. In this example, the substrate 210 may be an optically transparent material, such as polyethylene terephthalate (PET). The force-sensing films 212 may be made from transparent conductive materials include, for example, polyethyleneioxythiophene (PEDOT), indium tin oxide (ITO), carbon nanotubes, graphene, silver nanowire, other metallic nanowires, and the like. In certain embodiments, the force-sensing films 212 may be selected at least in part on temperature characteristics. For example, the material selected for the force-sensing films 212 may have a negative temperature coefficient of resistance such that, as temperature increases, the resistance decreases.

In this example, the force-sensing films 212 are formed as an array of rectilinear film elements, although other shapes and array patterns could also be used. In many examples, each individual force sensing film 212 may have a selected shape and/or pattern. For example, in certain embodiments, the force sensing film 212 may be deposited in a serpentine pattern, such as shown in FIG. 2B. The force sensing film 212 may include at least two electrodes 212a, 212b for connecting to a sensing circuit. In other cases, the force sensing film 212 may be electrically connected to sense circuitry without the use of electrodes. For example, the force sensing film 212 may be connected to the sense circuitry using conductive traces that are formed as part of the film layer.

FIG. 2C depicts a side view of a portion of the example strain-sensitive structure 200 of FIG. 2A taken along line A-A. As depicted in this cross-section, a first substrate 210 may be disposed below a force-receiving surface 240. The force-receiving surface 240 may be comprised of a material such as glass. In some embodiments, the force-receiving surface 240 may be another layer within a display stack, such as a cover glass element. The force-receiving surface 240 may be made from a material having high strain transmission properties. In other words, the force-receiving surface 240 may be made from a hard or otherwise rigid material such as glass or metal such that a force received may be effectively transmitted through the force-receiving surface 240 to the layers disposed below.

Below the force-receiving surface 240 and the first substrate 210 and the plurality of independent strain-sensitive films 212 is an intermediate layer 202. The intermediate layer 202 may be made from any number of suitably compliant materials. For example, in some embodiments a low durometer elastomer may be used (in one example, the elastomer may have a durometer less than 25 Shore).

In other examples, the intermediate layer 202 may be made from a compliant adhesive. In many embodiments, the compliant adhesive may be an optically clear adhesive. For example, the intermediate layer 202 may be made from an acrylic adhesive having a thickness of about 50 microns. In some embodiments, a thicker or thinner layer of adhesive may be used. In one embodiment, the intermediate layer 202 may be made from a number of independent layers, each having a different relative compliance. For example, a lower durometer adhesive may be layered atop a higher durometer adhesive.

In still further embodiments, the material for the intermediate layer 202 may be selected at least in part for its modulus of elasticity. For example, in certain embodiments, a particularly low modulus of elasticity such that the intermediate layer 202 is exceptionally pliant.

In further examples, the material selected for the complaint layer 202 may have a variable modulus of elasticity. For example, the complaint layer 202 may be particular compliant in one portion, and may be particularly non-complaint in another portion. In this manner, the complaint layer may be adapted to include a variable modulus of elasticity throughout its thickness.

In still further examples, the material for the complaint layer 202 may be layered to various thicknesses. The layering may augment the modulus of elasticity. For example, as a layering of the intermediate layer 202 increases, the modulus of elasticity may be increase. In a like manner, the modulus of elasticity of the intermediate layer 202 may decrease if the material is applied thinly. In some examples, the intermediate layer may be made from an acrylic adhesive applied to a thickness of 15 micrometers. In some embodiments, a 15 micrometer acrylic adhesive intermediate layer may have a modulus of elasticity that is only fifty-five percent of the modulus of elasticity of the same layer at 125 micrometers.

In this manner, the thickness, composition, and modulus of elasticity of the material selected for the complaint layer 202 may vary from embodiment to embodiment.

In alternative embodiments, the intermediate layer 202 may be made from a mechanically rigid and thermally conductive layer.

Below the intermediate layer 202 is a second substrate 220 having a plurality of independent strain-sensitive films 222 positioned thereon. Similarly to the first substrate 210, the second substrate 220 may be made from an optically transparent material, such as polyethylene terephthalate (PET). In this example, the force-sensing films 222 may be formed as an array of rectilinear film elements each aligned vertically with a respective one of the array independent strain-sensitive films 212. In many examples, each individual force sensing film 222 may take a selected shape. For example, in certain embodiments, the force sensing film 222 may be deposited in a serpentine pattern, similar to the serpentine pattern shown for force sensing film 212 in FIG. 2B.

The strain-sensitive films 212, 222 are typically connected to sense circuitry 105 that is configured to detect changes in an electrical property of each of the strain-sensitive films 212, 222. In this example, the sense circuitry 105 may be configured to detect changes in the resistance of the strain-sensitive film 212, 222, which can be used to estimate a force that is applied to the device. In some cases, the sense circuitry 105 may also be configured to provide information about the location of the touch based on the relative difference in the change of resistance of the strain-sensitive films 212, 222.

The sensing circuitry 105 may be adapted to determine a difference between a force experienced by the strain-sensitive film 212 and the force experienced by the strain-sensitive film 222. For example, as described above, a force may be received at the force-receiving surface 240. As a result of the rigidity of the force-receiving surface 240, the force received may be effectively transferred to the first substrate 210. Because the strain-sensitive film 212 is affixed to the first substrate 210, the strain-sensitive film 212 experiences the force as well, and passes the force to the intermediate layer 202. However, due to the compliance of the complaint layer 202, the intermediate layer 202 may substantially absorb the force received from the strain-sensitive film 212. As a result, the complaint layer 202 may not pass a substantial force to the strain-sensitive film 222. Accordingly, the strain-sensitive film 222 may not register that a force is present, even when strain-sensitive film 212 does register that a force is present.

As noted above, an additional function of the intermediate layer 240 is to normalize the temperature between aligned strain-sensitive film 212 and the respective one strain-sensitive film 222. In this manner, the temperature of the strain-sensitive film 212 and the temperature of strain-sensitive film 222 may be substantially equal.

Availing the benefit of both the thermal conductivity and mechanical compliance of the complaint layer 240 allows certain embodiments to substantially reduce or eliminate any strain sensor drift resulting from temperature change, either locally or globally. For example, in a typical embodiment, the first and second strain-sensitive films 212, 222 may be resistive elements electrically connected as a voltage divider. In certain examples the strain-sensitive film 212 may be positioned as the ground-connected resistor of the voltage divider and the strain-sensitive film 222 may be positioned as the supply-connected resistor of the voltage divider. As is known in the art, the voltage at the midpoint of the strain-sensitive film 212 and strain-sensitive film 222 may be calculated by multiplying the supply voltage by the ratio of the ground-connected resistor to the total resistance (i.e., supply-connected resistor summed with the ground-connected resistor). In other words, the voltage at the midpoint of the voltage divider, $V_{out}$ may be found, in a simplified example, by using the equation:

$$V_{out} = V_{supply}\left(\frac{R_{ground}}{R_{ground} + R_{supply}}\right) \qquad \text{Equation 1}$$

Due to fact that the resistance of resistive elements $R_{ground}$ and $R_{supply}$ (or strain-sensitive film 212 and strain-sensitive film 222, respectively) changes in response to force and in response to temperature, the resistance of either element may be calculated as a function of both force (i.e., strain) and as a function of temperature, using as a simplified example, the equation:

$$R_{measured} \cong R_{baseline}(1+\alpha \cdot T_{actual})(1+g \cdot \epsilon_{applied}) \qquad \text{Equation 2}$$

The approximation described by Equation 2 states that the base resistance $R_{baseline}$ of either $R_{ground}$ and $R_{supply}$ may be altered by the both temperature and strain applied to the material. The effects of temperature changes may be approximated by the product of the temperature coefficient of resistance $\alpha$ of the material selected for the strain-sensitive film, and the actual temperature $T_{actual}$ of the element. Similarly, the effect of strain may be approximated by the product of the strain coefficient of resistance g and the strain applied $\epsilon_{applied}$ to the element.

By substituting Equation 2 into Equation 1 after entering the known quantities $V_{supply}$, $R_{baseline}$, $\alpha$, and g and measured quantities $V_{out}$, the strain applied to each element $\epsilon_{212}$ and $\epsilon_{222}$ and the actual temperature of each element $T_{212}$ and $T_{222}$ are the only remaining unknown variables, which may be further simplified as a difference in strain $\Delta\epsilon$ between the strain-sensitive films 212, 222 and a difference in temperature $\Delta T$ between the strain-sensitive films 212, 222.

Accordingly, the fact that the complaint layer 240 substantially normalizes the temperature between the strain-sensitive films 212, 222, the difference in temperature $\Delta T$ may be functionally approximated as zero. Relatedly, the fact that the intermediate layer 240 substantially reduces the strain experienced by the strain-sensitive film 222, the strain $\epsilon_{222}$ may be functionally approximated as zero. In this manner, the only remaining unknown is the strain $\epsilon_{212}$ as experienced by the strain-sensitive film 212. Accordingly, $\epsilon_{212}$ may be solved for and passed to an electronic device as a force measurement.

Figure 3A:
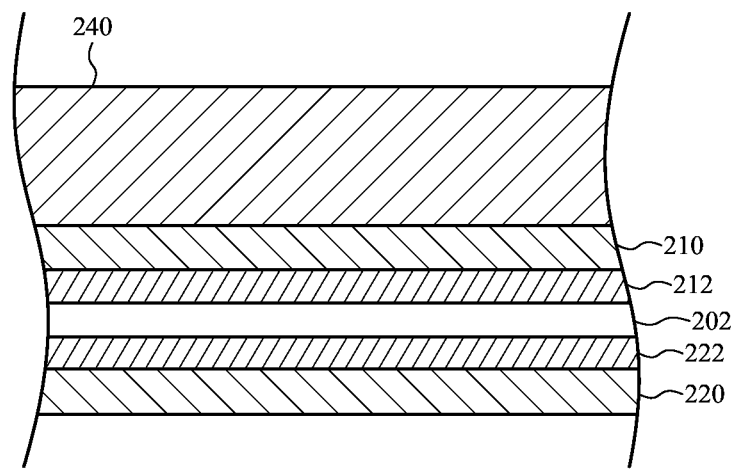
FIG. 3A depicts an enlarged detail side view of the example strain-sensitive structure of FIG. 2B taken along line B-B.
Figure 3B:
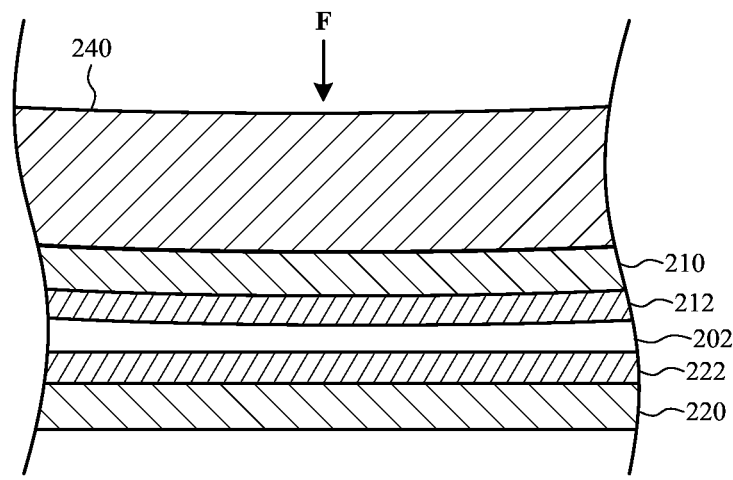
FIG. 3B depicts an enlarged detail side view of the example strain-sensitive structure of FIG. 2B taken along line B-B, deformed in response to an applied force.

FIG. 3A depicts an enlarged detail side view of the example strain-sensitive structure of FIG. 2B taken along line B-B. As shown, a strain-sensitive film 212 is disposed along a bottom surface of the first substrate 210, which itself is adhered or otherwise affixed to a bottom surface of a force-receiving surface 240. Facing the first strain-sensitive film 212 is a second strain-sensitive film 222, adhered to a second substrate 210. Positioned between the strain-sensitive films 212, 212 is an intermediate layer 202. When a force F is received, the force-receiving surface 240, the first substrate 210 and the force-sensing film 212 may at least partially deflect, as shown for example in FIG. 3B. As a result of the compliance of the intermediate layer 202, the force sensing film 222 may not deflect in response to the force F.

Figure 4:
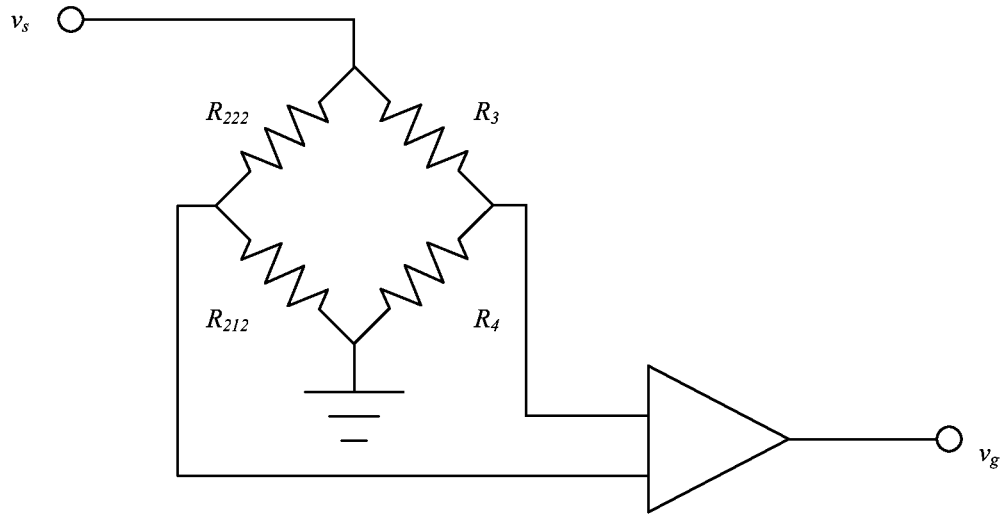
FIG. 4 depicts a simplified schematic diagram of a temperature-compensating and optically transparent force sensor.

FIG. 4 depicts a simplified signal flow diagram of a temperature-compensating and optically transparent force sensor in the form of a Wheatstone bridge. In such an embodiment, a voltage Vg may be measured across the output of two parallel voltage dividers connected to a voltage supply Vs. One of the voltage dividers may include two resistors of known resistance $R_3$, $R_4$ and the other voltage divider may include two variable resistors that model the force and temperature variable resistance of the strain-sensitive films 212, 222 as shown, for example, in FIGS. 2A-3. By substituting, for example, Equation 2 into Equation 1 after entering the known quantities $V_{supply}$, $R_{baseline}$, $\alpha$, g, $R_3$, and $R_4$, and measured quantities $V_{out}$, the strain $\epsilon_{212}$ applied to the strain-sensitive element 212 becomes the only remaining unknown and accordingly may be solved for and utilized by an electronic device as a force measurement.

Figure 5A:
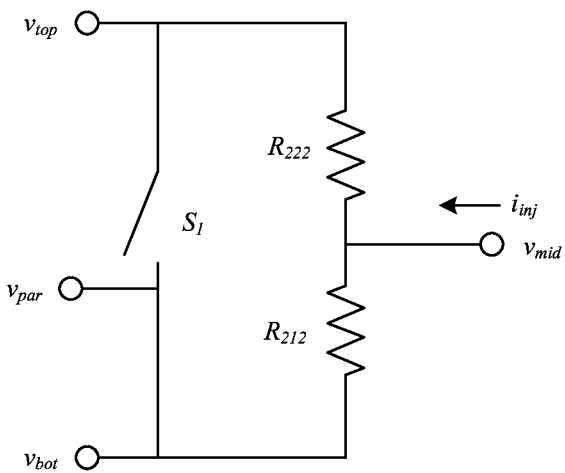
FIG. 5A depicts a simplified signal flow diagram of a temperature-compensating and optically transparent force sensor.

FIG. 5A depicts a simplified signal flow diagram of a temperature-compensating force sensor in the form of a voltage divider. In such an embodiment, a voltage Vtop may be applied through the resistance of the strain-sensitive films 212, 222. By measuring the voltage out Vmid, the resistance of the strain-sensitive films 212, 222 can be measured, and as with the embodiment as shown in FIG. 4, force output may be solved for and may be passed to an electronic device as a force measurement.

In certain embodiments, the circuit can be dynamically reorganized to measure the parallel resistance of the strain-sensitive films 212, 222. By closing the switch S1, the $V_{top}$ node may be electrically coupled to the $V_{bot}$ node. One many appreciate that the switch S1, need not necessarily be a physical element and may be omitted from certain embodiments. Thereafter, a current $I_{injected}$ can be injected at the $V_{mid}$ node and a voltage across the now parallel strain-sensitive films 212, 222 can be measured between $V_{mid}$ and $V_{par}$. One may appreciate that the node $V_{par}$ is one representative location from which a comparative voltage measurement may be taken and other locations are possible.

One may appreciate that by combining measurements from the voltage divider configuration and the parallel resistor configuration, the actual resistances of each of the strain-sensitive films 212, 222 can be calculated. For example, substituting into Equation 1, the output voltage of the voltage divider configuration can be modeled as:

$$V_{mid} = V_{top}\left(\frac{R_{212}}{R_{222} + R_{212}}\right) \qquad \text{Equation 3}$$

Although $V_{mid}$ can be measured and $V_{top}$ is known, the remaining unknown variables of the equation generally cannot be solved. As one example the strain-sensitive films 212, 222 represent two unknown variables within a single equation. However, when the switch $S_1$ is closed and the circuit is configured into the parallel configuration, the configuration can be modeled as:

$$V = I_{injected}\left(\frac{1}{\frac{1}{R_{222}} + \frac{1}{R_{212}}}\right) \qquad \text{Equation 4}$$

As can be appreciated, between Equation 3 and Equation 4, the resistances of the strain-sensitive films 212, 222 are the only unknown variables. By substituting one equation into the other, the actual resistance of both resistive elements can be determined.

Figure 5B:
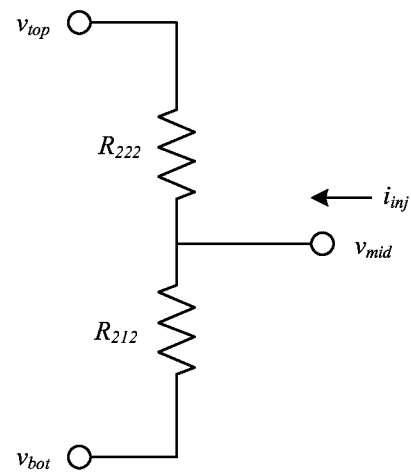
FIG. 5B depicts a simplified schematic diagram of another temperature-compensating and optically transparent force sensor.

In some embodiments, AC modulation of the voltage and current can be used to measure the voltage divider and the parallel resistance of a Wheatstone bridge configuration. For example, as illustrated in FIG. 5B, alternating current $I_{injected}$ can be injected at the $V_{mid}$ node into the strain-sensitive films 212, 222 at a first frequency (w1) while an alternating voltage V may be placed across the strain sensitive Wheatstone bridge at a second frequency (w2). Thereafter, a time-varying voltage can be measured between $V_{mid}$ and a reference point (e.g., ground). The resistances of the strain-sensitive elements 212, 222 can be determined from Equations 3 and Equation 4.

Figure 5C:
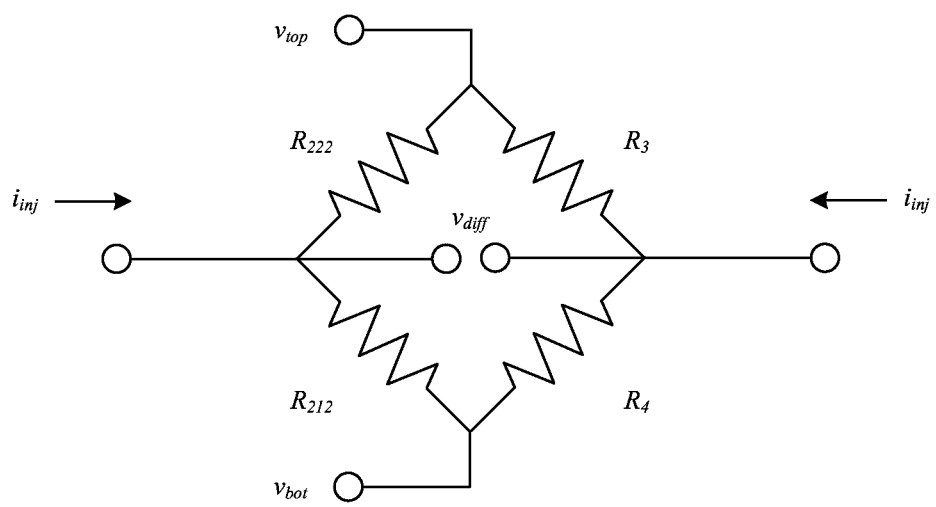
FIG. 5C depicts a simplified schematic diagram of another temperature-compensating and optically transparent force sensor.

FIG. 5C depicts a simplified signal flow diagram of another temperature-compensating and optically transparent force sensor in the form of a Wheatstone bridge. As with other Wheatstone embodiments described herein, two reference resistors of known resistance R3 and R4 can be coupled to two sensing resistors, illustrated as the strain-sensitive films 212, 222. As noted above, if the temperature of the strain-sensitive films 212, 222 is substantially equal, the differential resistance $V_{diff}$ does not change in response to changes in temperature of the force sensor. However, if the strain-sensitive films 212, 222 are not closely thermally coupled, or if the materials are not identical in their temperature response (e.g., coefficient of thermal expansion), the differential resistance $V_{diff}$ may change as a function of temperature.

The magnitude of the response of $V_{mid}$ node at frequencies w1 and w2 can be used with equations 3 and 4 above to extract the dynamic resistance R1 and R2 of the sensor. The magnitude of the response at w2, which corresponds to the parallel impedance of the resistors, can be used to increase the accuracy of the measured resistance obtained from the differential voltage magnitude at w1. For example, the parallel impedance of the two resistors may be a function of both temperature and applied force, with changes in temperature correlated to larger changes in parallel impedance and changes in applied force correlated to smaller chance in parallel impedance. As a result, a temperature value can be inferred from the parallel impedance to correct any shift of the sensor differential measurement resulting from changes in temperature.

In some embodiments, a similar voltage and current drive can be applied to a reference circuit to at least a portion the temperature variation common mode and thus reduced and/or eliminated by a differential measurement. In this manner, the differential dynamic range required of the measurement circuit can be reduced.

In some embodiments, once the temperature of the sensor is determined, correction terms may be calculated. Such terms may be a function of the time derivative of the temperature. For example, if the sensor is undergoing heating from the top surface (e.g., from a user's finger), the top and bottom strain resistors may see a temperature difference caused by a flux of heat into the sensor. In this example, a correction term may be calculated and applied which may be proportional to the time rate of change of the sensor temperature.

In some embodiments, correction terms may be calculated which are a function of the direction of thermal flux. For example, if the sensor is undergoing a flux of thermal energy from a heat source below, the top and bottom strain resistors may see a temperature difference caused by a flux of heat through the sensor. For example, a correction term may be calculated and applied which may be proportional to the difference between sensor temperature and a measured temperature of a structure underlying the sensor. For example, a heat sink may be placed in proximity of the bottom of the force sensing surface. Thereafter, the temperature of the heat sink (measured directly or indirectly) may be used as a correction term.

In some embodiments, the temperature of other sensing elements and/or other temperatures in the system may cause an offset to the strain measurement. Some embodiments can define a matrix of coefficients which linearly relates these temperatures to the strain offsets of the sensors. The temperatures and strains for all the sensors can be measured at a time when the sensor system is not subject to actual strain. For example, a touch sensor can determine that a user is not touching, and therefore not applying force, to the sensor. The matrix of coefficients can be used to improve the accuracy of the strain measurement by any suitable method, such as by least squares regression. At a later time, when an actual force is applied to the sensor, the correction matrix can be used to improve the accuracy of the measured strain, which in turn can be correlated to force applied.

In some embodiments, a switch need not be required. For example, as illustrated in FIG. 5B, current $I_{injected}$ can be injected at the $V_{mid}$ node into the strain-sensitive films 212, 222. A voltage can then be measured from $V_{bot}$ to $V_{top}$. The voltage may be measured and calculated using Equation 4, above.

Accordingly, to compensate for changes in temperature, a current can be injected as described with respect to FIG. 5A-5B. In response, the differential voltage $V_{diff}$ will rise in accordance with Equation 4. In this manner, the change in resistance (as a result of temperature) of the strain-sensitive films 212, 222 can be calculated. Next, by utilizing the known thermal coefficient of resistance for the material forming the strain-sensitive films 212, 222, the temperature can be derived.

In many embodiments, a current proportional to the injected current can be injected into the resistors of known resistance R3 and R4. The proportional current can prevent, mitigate, or reduce other noise sources such as common-mode noise, timing jitter (between current injection and sampling, and so on) and/or power supply noise.

In these embodiments, the force sensor may compensate for changes in temperature. More particularly, in certain embodiments, the temperature calculated from the known change in resistance of an idle force sensor can be used to adjust force measurements over time. For example, by recording the temperature and/or the change in idle resistance of the force sensors over time a statistical model of the temperature dependence of the force sensor can be formed. The statistical model may be used to bias a force measurement up or down to correct for the effects of temperature. For one example, for small, linear changes in temperature, the statistical model may be applied to the measured output voltage of the Wheatstone bridge, such as by the linear equation:

$$V_{measured} = V_0 + a*T \qquad \text{Equation 5}$$

In such an example, the output voltage $V_{measured}$ can be the voltage output from the Wheatstone bridge when force input is not being received. Correspondingly, the voltage as a result of the injected current can be calculated $$V_{measured} = V_0 + b*T \qquad \text{Equation 6}$$

Over time, the ratio of the two linear coefficients a and b may be calculated and may be used when calculating the force of future inputs.

Figure 6:
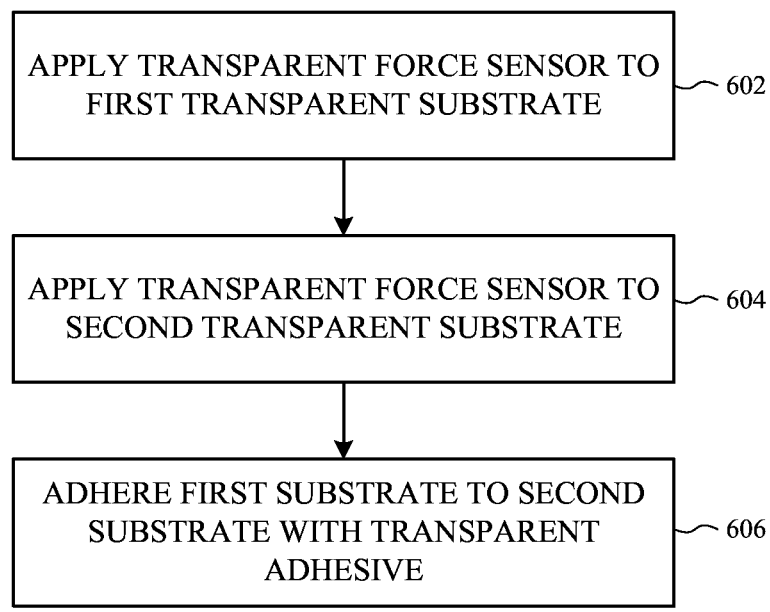
FIG. 6 is a process flow diagram illustrating example operations of a method of manufacturing a temperature-compensating and optically transparent force sensor.

FIG. 6 is a process flow diagram illustrating example operations of a sample method of manufacturing a temperature-compensating and optically transparent force sensor. The process may begin at operation 604 in which a transparent force sensor may be applied to a first substrate. Subsequently, a second substrate may be selected at operation 604 after which a transparent force sensor may be applied. At operation 606, the first and second substrates may be bonded or adhered together with an optically transparent adhesive. It should be appreciated that the order of operations may vary between embodiments.

Figure 7:
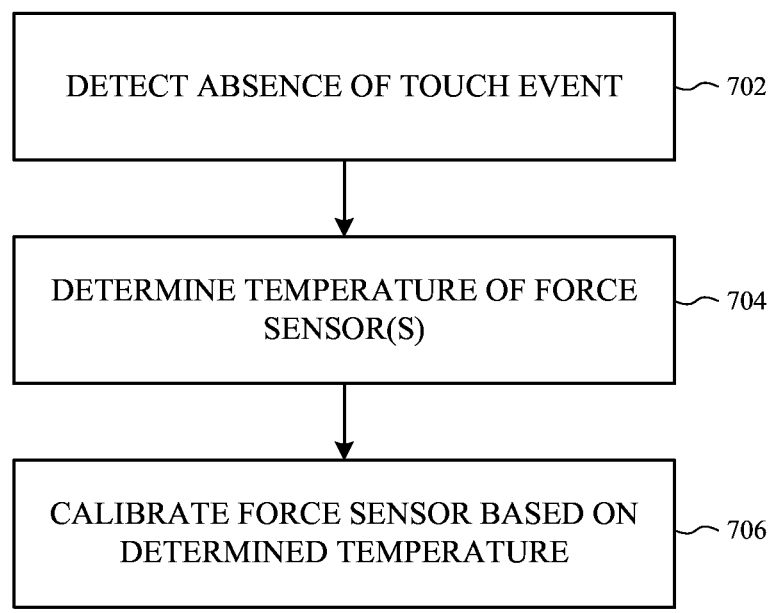
FIG. 7 is a process flow diagram illustrating example operations of a method of operating a temperature-compensating force sensor.

FIG. 7 is a process flow diagram illustrating example operations of a sample method of operating a temperature-compensating force sensor. First, at operation 702, an absence of a touch event can be determined. For example, a touch sensor can report to a force sensor that a user is not touching the screen. Thereafter, at operation 704, the temperature (under no-load) of one or more force sensor can be determined. After the temperature of the force sensors is determined, the force sensor may be calibrated based, at least in part, on the determined temperature at operation 706. For example, in some embodiments, the thermal coefficient of expansion of one or more materials selected for the force sensor may be known. Accordingly, once the temperature of the force sensor is known, the coefficient of thermal expansion may be used to predict the amount of stress and/or strain within the force sensor. Because the determination is completed while the force sensor is in an idle state (e.g., no load), the predicted amount of stress and/or strain may be subtracted and/or added to an actual force input received at a later time.

Figure 8:
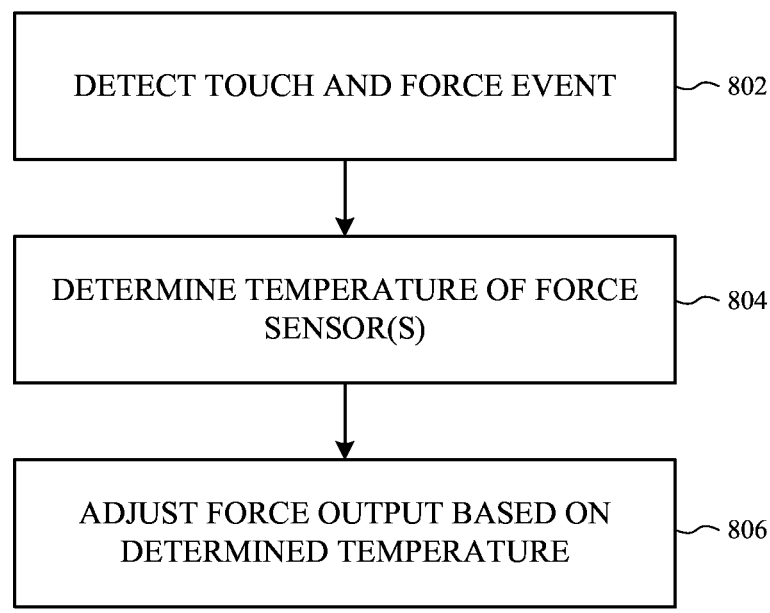
FIG. 8 is an additional process flow diagram illustrating example operations of a method of operating a temperature-compensating force sensor.

FIG. 8 is an additional process flow diagram illustrating example operations of a method of operating a temperature-compensating force sensor. First, at 802 a location of a user touch may be identified. Next, a difference may be measured between a first force sensor and a second force sensor. From this difference, an applied force may be derived and used to approximate the centroid of the applied force. At operation 804, the temperature of the first force sensor and the second force sensor can be calculated. The calculated temperature may thereafter be used to adjust the force measurement of operation 802 at operation 804.

Figure 9:
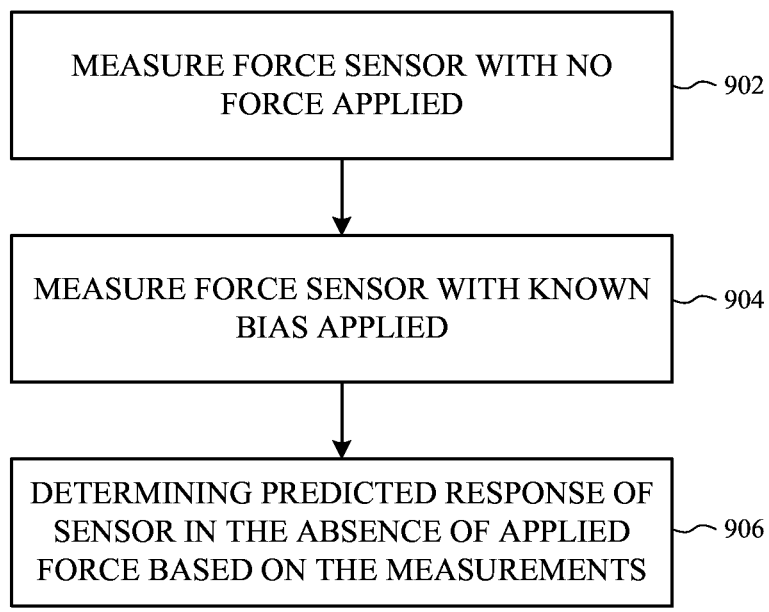
FIG. 9 is an additional process flow diagram illustrating example operations of a method of operating a temperature-compensating force sensor.

FIG. 9 is an additional process flow diagram illustrating example operations of a method of operating a temperature-compensating force sensor. At 902, a force sensor can be measured in the absence of any force. Next at 904, the force sensor can be measured with a particular known bias. For example, a known current can be injected into the force sensor. Finally at 906, a predicted response of the force sensor in the absence of force can be determined based on the measurements of 902 and 904.

One may appreciate that although many embodiments are disclosed above, that the operations and steps presented with respect to methods and techniques described herein are meant as exemplary and accordingly are not exhaustive. One may further appreciate that alternate step order or, fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
 an input surface comprising:
  a substrate;
  a first sensor coupled to the substrate and formed from a material with a first strain-sensitive electrical property; and
  a second sensor positioned below and aligned with the first sensor, coupled to the substrate, and separated from the first sensor by a selected distance, the second sensor formed from a material with a second strain-sensitive electrical property; and
 a controller configured to obtain a measurement representing a difference between the first strain-sensitive electrical property and the second strain-sensitive electrical property.

2. The electronic device of claim 1, wherein the controller is configured to obtain a first single-ended measurement of the first strain-sensitive electrical property and, separately, a second single-ended measurement of the second strain-sensitive electrical property.

3. The electronic device of claim 1, wherein the first strain-sensitive electrical property and the second strain-sensitive electrical property comprises electrical resistance.

4. The electronic device of claim 1, wherein the first strain-sensitive electrical property and the second strain-sensitive electrical property comprises an induced charge.

5. The electronic device of claim 1, wherein the first and second sensors are formed from an indium-tin oxide.

6. The electronic device of claim 1, wherein the first and second sensors are formed, at least in part, of one of the group consisting of carbon nanotubes and graphene.

7. The electronic device of claim 1, the substrate further comprising a top surface;
 wherein:
  the first sensor is positioned a first distance from the top surface; and
  the second sensor is positioned a second distance from the top surface.

8. An electronic device comprising:
 an input surface comprising:
  a substrate having a top surface;
  a strain sensor coupled to the substrate and comprising:
   a first and second strain-sensitive resistors arranged as a voltage divider, the first strain-sensitive resistor having a first strain-sensitive electrical property and being separated from the top surface by a first distance and the second strain-sensitive resistor having a second strain-sensitive electrical property and being separated from the top surface by a second distance; and
   a common node coupled to both the first and second strain-sensitive resistor; and
  a controller configured to perform the operations of:
   injecting a selected current into the common node; and
   measuring a voltage between the common node and ground, the voltage representing a difference between the first strain-sensitive electrical property and the second strain-sensitive electrical property.

9. The electronic device of claim 8, wherein the first and second strain-sensitive resistors are formed from an indium-tin oxide.

10. The electronic device of claim 8, wherein the first and second strain-sensitive resistors are formed, at least in part, of one of the group consisting of carbon nanotubes and graphene.

11. The electronic device of claim 8 wherein the substrate is formed from glass.

12. The electronic device of claim 8, wherein the first and second strain-sensitive resistors are formed from materials having substantially identical temperature coefficients of resistance.

13. The electronic device of claim 8, wherein the first and second strain-sensitive resistors are formed from materials having substantially identical coefficients of thermal expansion.

* * * * *